United States Patent
Li et al.

(10) Patent No.: US 10,229,330 B2
(45) Date of Patent: Mar. 12, 2019

(54) METHOD AND APPARATUS FOR DETECTING VEHICLE CONTOUR BASED ON POINT CLOUD DATA

(71) Applicant: Baidu Online Network Technology (Beijing) Co., Ltd., Beijing (CN)

(72) Inventors: Bo Li, Beijing (CN); Tianlei Zhang, Beijing (CN); Tian Xia, Beijing (CN); Ji Tao, Beijing (CN); Yuanqing Lin, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 133 days.

(21) Appl. No.: 15/246,394

(22) Filed: Aug. 24, 2016

(65) Prior Publication Data
US 2017/0213093 A1   Jul. 27, 2017

(30) Foreign Application Priority Data
Jan. 27, 2016 (CN) .......................... 2016 1 0057306

(51) Int. Cl.
*G06K 9/00* (2006.01)
*G06N 3/04* (2006.01)
(Continued)

(52) U.S. Cl.
CPC ..... *G06K 9/00805* (2013.01); *G06K 9/00208* (2013.01); *G06K 9/4628* (2013.01); *G06K 9/6273* (2013.01); *G06N 3/04* (2013.01); *G06N 3/08* (2013.01); *G06T 7/12* (2017.01); *G06T 2200/04* (2013.01);
(Continued)

(58) Field of Classification Search
None
See application file for complete search history.

(56) References Cited

U.S. PATENT DOCUMENTS 9,730,643 B2 * 8/2017 Georgescu ........... A61B 5/7267
9,805,274 B2 * 10/2017 Ayvaci ..................... G06T 7/13
(Continued)

FOREIGN PATENT DOCUMENTS

CN   104463241 A   3/2015
CN   104537387     4/2015
(Continued)

*Primary Examiner* — Iman K Kholdebarin
(74) *Attorney, Agent, or Firm* — Lathrop Gage LLP

(57) ABSTRACT

The present application discloses a method and apparatus for detecting a vehicle contour based on point cloud data. The method includes: acquiring to-be-trained point cloud data; generating label data corresponding to points in the to-be-trained point cloud data in response to labeling on the points in the to-be-trained point cloud, the labeling used to indicate whether each of the points in the to-be-trained point cloud data is on a vehicle contour; training a fully convolutional neural network model based on the points in the to-be-trained point cloud data and the label data corresponding to the points in the to-be-trained point cloud data, to obtain a vehicle detection model; and acquiring to-be-detected point cloud data, and obtaining a detection result corresponding to each to-be-detected point in the to-be-detected point cloud data based on the vehicle detection model. The implementation may achieve an accurate detection of the vehicle contour.

15 Claims, 5 Drawing Sheets

(51) Int. Cl.
*G06T 7/00* (2017.01)
*G06N 3/08* (2006.01)
*G06T 7/12* (2017.01)
*G06K 9/46* (2006.01)
*G06K 9/62* (2006.01)

(52) U.S. Cl.
CPC .............. *G06T 2207/10028* (2013.01); *G06T 2207/20081* (2013.01); *G06T 2207/20084* (2013.01); *G06T 2207/30252* (2013.01)

(56) References Cited

U.S. PATENT DOCUMENTS

| | | | |
|---|---|---|---|
| 9,886,771 B1* | 2/2018 | Chen | G06T 7/0032 |
| 9,886,774 B2* | 2/2018 | Fathi | G06T 7/579 |
| 9,904,867 B2* | 2/2018 | Fathi | G06K 9/00201 |
| 9,928,418 B2* | 3/2018 | Segalovitz | G06K 9/00442 |
| 2007/0024620 A1* | 2/2007 | Muller-Fischer | G06T 17/20 |
| | | | 345/427 |
| 2010/0080470 A1* | 4/2010 | Deluca | G06K 9/00664 |
| | | | 382/209 |
| 2010/0121577 A1 | 5/2010 | Zhang et al. | |
| 2015/0266472 A1 | 9/2015 | Ferguson et al. | |
| 2016/0174902 A1* | 6/2016 | Georgescu | G06T 7/73 |
| | | | 600/408 |
| 2017/0039436 A1* | 2/2017 | Chen | G06K 9/00798 |
| 2017/0076438 A1* | 3/2017 | Kottenstette | G06K 9/00637 |
| 2017/0116498 A1* | 4/2017 | Raveane | G06N 3/10 |
| 2017/0140236 A1* | 5/2017 | Price | G06K 9/4628 |
| 2017/0220887 A1* | 8/2017 | Fathi | G06K 7/1413 |
| 2017/0248969 A1* | 8/2017 | Ham | B64C 39/024 |
| 2017/0270406 A1* | 9/2017 | Visser | G06N 3/04 |
| 2017/0308736 A1* | 10/2017 | Sharma | G06K 9/00214 |
| 2017/0312032 A1* | 11/2017 | Amanatullah | A61B 34/10 |
| 2017/0313322 A1* | 11/2017 | Onorato | B60W 50/0098 |
| 2017/0364776 A1* | 12/2017 | Micks | G01S 13/006 |
| 2017/0372527 A1* | 12/2017 | Murali | G06T 19/20 |
| 2018/0018805 A1* | 1/2018 | Kutliroff | H04N 13/0257 |
| 2018/0046649 A1* | 2/2018 | Dal Mutto | G06F 17/30011 |
| 2018/0060725 A1* | 3/2018 | Groh | G06N 3/0454 |

FOREIGN PATENT DOCUMENTS

| | | |
|---|---|---|
| CN | 105184271 | 12/2015 |
| JP | H05334276 A | 12/1993 |
| JP | 2011065400 A * | 3/2011 |
| WO | WO2014/132490 | 9/2014 |

* cited by examiner

METHOD AND APPARATUS FOR DETECTING VEHICLE CONTOUR BASED ON POINT CLOUD DATA

CROSS-REFERENCE TO RELATED APPLICATION

This application is related to and claims priority from Chinese Application Ser. No. 201610057306.X, filed on Jan. 27, 2016, entitled "METHOD AND APPARATUS FOR DETECTING VEHICLE CONTOUR BASED ON POINT CLOUD DATA", the entire disclosure of which is hereby incorporated by reference.

TECHNICAL FIELD

The present application relates to the field of computer technology, specifically to the field of vehicle detection technology, and more specifically to a method and apparatus for detecting a vehicle contour based on point cloud data.

BACKGROUND

With the economic development and living standards improvement, the vehicle, as an indispensable commuting tool, has gradually entered into millions of households. However, the associated driving safety problem brings cloud into the sunny happy life. The number of deaths in traffic accidents in year 2010 in China is 65,225 as reported by the Ministry of Public Security, and is 275,983 as estimated by the WHO model, which is equivalent to a major air disaster every day. The number of casualties caused by traffic accidents in the world is equivalent to 13 times of that of the 911 disaster every year.

In the modern society with advanced science and technology, the populace clearly cannot tolerate successive occurrences of quasi-disasters. The need to drive safely has been unanimously recognized by the society. As driven by the government and the market, the vehicle safety technology has started to prosper. In terms of general classification, the vehicle safety technology may be divided into two main categories, namely, the passive safety and active safety. The passive safety refers to the technology to reduce the loss after a collision to a minimum, mainly the design related to the vehicle structure, seat belt, laminated windscreen glass, collapsible steering column, airbag, etc. However, since the mechanism of the passive protection is not triggered until the collision happens, the number of accidents which may be avoided is limited. The active safety refers to the advance warning technology to avoid the collision, which mainly relates to the perception, understanding, decision, and control on the driver's surrounding environment, such as the lane departure warning (LDW). In comparison, the active safety, for its advantages such as the foresight and the weak association with the vehicle design, has been widely studied, and debuted as the products of the Advanced Driver Assistance System (ADAS).

Vehicle detection technology is one of the essential technical pillars for the active safety. The existing technical solutions mostly adopt a single visual technology, which detects the vehicle by using a method of matching the features in images and is not capable of accurately providing the spatial location and attitude of the vehicle to be detected. Other technical solutions exist, which use laser point clouds as inputs and categorize the features such as the shape and point cloud density before detecting the vehicle. This method mostly requires significant manual adjustments, and has a poor adaptability to scenario changes.

SUMMARY OF THE INVENTION

An objective of the present application is to propose an improved method and apparatus for detecting a vehicle contour based on point cloud data, so as to solve the technical problems mentioned in the Background.

In the first aspect, the present application provides a method for detecting a vehicle contour based on point cloud data, comprising: acquiring to-be-trained point cloud data; generating label data corresponding to points in the to-be-trained point cloud data in response to labeling on the points in the to-be-trained point cloud, the labeling used to indicate whether each of the points in the to-be-trained point cloud data is on a vehicle contour; training a fully convolutional neural network model based on the points in the to-be-trained point cloud data and the label data corresponding to the points in the to-be-trained point cloud data, to obtain a vehicle detection model; and acquiring to-be-detected point cloud data, and obtaining a detection result corresponding to each to-be-detected point in the to-be-detected point cloud data based on the vehicle detection model.

In some embodiments, the acquiring of to-be-trained point cloud data comprises: mapping to-be-trained three-dimensional data, collected by a point cloud data collecting device, to generate a to-be-trained depth map, the values of respective pixel points in the to-be-trained depth map being respective points in the to-be-trained point cloud data corresponding to the to-be-trained three-dimensional data.

In some embodiments, the to-be-trained three-dimensional data D (x, y, z) is a coordinate in a coordinate system taking the point cloud data collecting device as an origin, an upward vertical direction as a z axis, and any two axes perpendicular to each other in a horizontal plane as an x axis and a y axis; the coordinate of each pixel point in the to-be-trained depth map is (r, c), and the value of each of the pixel points is (d, z); wherein:

$r = \lfloor \theta/\Delta\theta \rfloor$ $c = \lfloor \phi/\Delta\phi \rfloor$ $d = \sqrt{x^2 + y^2}$ $\theta = a \tan 2(y, x)$ $\phi = \arcsin(z/\sqrt{x^2+y^2+z^2})$;

$\theta$ is an angle between a line connecting the to-be-trained three-dimensional data D to the origin and a first plane, $\Delta\theta$ is a horizontal resolution of the point cloud data collecting device, and the first plane is a plane where the y axis and the z axis locate; and $\phi$ is an angle between a line connecting the to-be-trained three-dimensional data D to the origin and a second plane, $\Delta\phi$ is a vertical resolution of the point cloud data collecting device, and the second plane is a plane where the x axis and the y axis locate.

In some embodiments, the generating of label data corresponding to points in the to-be-trained point cloud data in response to labeling on the points in the to-be-trained point cloud data comprises: transforming a point in the to-be-trained point cloud data to generate two-dimensional label data with 26 channels if the point is on the vehicle contour, wherein the value of a first channel in the 26 channels is 1, the value of a second channel in the 26 channels is 0, and the $3^{rd}$-$26^{th}$ channels in the 26 channels are respective rotation vectors of coordinates of vertexes of a three-dimensional cube where a vehicle is located with respect to a three-dimensional coordinate of the point on the vehicle contour in the to-be-trained point cloud data; and transforming a point in the to-be-trained point cloud data to generate two-dimensional label data with 2 channels if the point is not on the vehicle contour, wherein the value of a first channel in the 2 channels is 0, and the value of a second channel in the 2 channels is 1.

In some embodiments, the rotation vector $(x'_p, y'_p, z'_p)$ of a coordinate of a vertexe of a three-dimensional cube where a vehicle is located with respect to a three-dimensional coordinate of the point on the vehicle contour in the to-be-trained point cloud data is:

$$\begin{pmatrix} x'_p \\ y'_p \\ z'_p \end{pmatrix} = R^T \begin{pmatrix} x_p - x_i \\ y_p - y_i \\ z_p - z_i \end{pmatrix};$$

wherein R is a rotation matrix of a point $P(x_i, y_i, z_i)$ on the vehicle contour in the point cloud data, and:

$$R = R_{zi}(\theta_i) R_{yi}(\phi_i);$$

$$\theta_i = a\tan 2(y_i, x_i)$$

$$\phi_i = \arcsin(z_i / \sqrt{x_i^2 + y_i^2 + z_i^2});$$

$$R_{zi}(\theta_i) = \begin{bmatrix} \cos\theta_i & -\sin\theta_i & 0 \\ \sin\theta_i & \cos\theta_i & 0 \\ 0 & 0 & 1 \end{bmatrix};$$

$$R_{yi}(\phi_i) = \begin{bmatrix} \cos\phi_i & 0 & \sin\phi_i \\ 0 & 1 & 0 \\ -\sin\phi_i & 0 & \cos\phi_i \end{bmatrix}.$$

In some embodiments, the training of a fully convolutional neural network model based on the points in the to-be-trained point cloud data and the label data corresponding to the points in the to-be-trained point cloud data, to obtain a vehicle detection model comprises: initializing parameters of the fully convolutional neural network; adjusting the parameters of the fully convolutional neural network based on a loss function, wherein the loss function is a deviation between the label data corresponding to a current output and the label data corresponding to the to-be-trained point cloud data, and the current output is an output of the fully convolutional neural network corresponding to current to-be-trained point cloud data and current parameters of the fully convolutional neural network; outputting parameters corresponding to the loss function as parameters of the vehicle detection model if the loss function is at a minimum value; and otherwise, returning to execute the step of adjusting the parameters of the fully convolutional neural network based on a loss function.

In some embodiments, the acquiring of to-be-detected point cloud data, and obtaining of a detection result corresponding to each to-be-detected point in the to-be-detected point cloud data based on the vehicle detection model comprises: mapping to-be-detected three-dimensional data, which is collected by the point cloud data collecting device, to generate a to-be-detected depth map, the values of pixel points in the to-be-detected depth map corresponding to respective to-be-detected points in the to-be-detected point cloud data corresponding to the to-be-detected three-dimensional data; acquiring a predicted result of each of the to-be-detected points in the to-be-detected point cloud data based on the vehicle detection model, wherein the predicted result comprises a probability that the to-be-detected point is on the vehicle contour; and determining that a to-be-detected point is on the vehicle contour if the probability that the to-be-detected point is on the vehicle contour is greater than a preset threshold.

In some embodiments, the predicted result further comprises location information of the to-be-detected point; the acquiring of to-be-detected point cloud data, and obtaining of a detection result corresponding to each to-be-detected point in the to-be-detected point cloud data based on the vehicle detection model further comprises: acquiring first to-be-detected points whose probabilities are each greater than the preset threshold in the to-be-detected point cloud data, to form a set of the first to-be-detected points; and generating spatial vehicle location information corresponding to the to-be-detected point cloud data based on the location information of the to-be-detected points in the set of the first to-be-detected points.

In the second aspect, the present application provides an apparatus for detecting a vehicle contour based on point cloud data, which includes: an acquiring module, configured to acquire to-be-trained point cloud data; a label data generating module, configured to generate label data corresponding to points in the to-be-trained point cloud data in response to labeling on the points in the to-be-trained point cloud data, the labeling used to indicate whether each of the points in the to-be-trained point cloud data is on a vehicle contour; a training module, configured to train a fully convolutional neural network model based on the points in the to-be-trained point cloud data and the label data corresponding to the points in the to-be-trained point cloud data, to obtain a vehicle detection model; and a detecting module, configured to acquire to-be-detected point cloud data, and obtain a detection result corresponding to each to-be-detected point in the to-be-detected point cloud data based on the vehicle detection model.

In some embodiments, the acquiring module is further configured to: map to-be-trained three-dimensional data, collected by a point cloud data collecting device, to generate a to-be-trained depth map, the values of respective pixel points in the to-be-trained depth map being respective points in the to-be-trained point cloud data corresponding to the to-be-trained three-dimensional data.

In some embodiments, the to-be-trained three-dimensional data D (x, y, z) is a coordinate in a coordinate system taking the point cloud data collecting device as an origin, an upward vertical direction as a z axis, and any two axes perpendicular to each other in a horizontal plane as an x axis and a y axis; the coordinate of each pixel point in the to-be-trained depth map is (r, c), and the value of each of the pixel points is (d, z); wherein $$r = \lfloor \theta / \Delta\theta \rfloor$$

$$c = \lfloor \phi / \Delta\phi \rfloor$$

$$d = \sqrt{x^2 + y^2}$$

$$\theta = a\tan 2(y, x)$$

$$\phi = \arcsin(z / \sqrt{x^2 + y^2 + z^2});$$

θ is an angle between a line connecting the to-be-trained three-dimensional data D to the origin and a first plane, Δθ is a horizontal resolution of the point cloud data collecting device, and the first plane is a plane where the y axis and the z axis locate; and φ is an angle between a line connecting the to-be-trained three-dimensional data D to the origin and a second plane, Δφ is a vertical resolution of the point cloud data collecting device, and the second plane is a plane where the x axis and the y axis locate.

In some embodiments, the label data generating module is further configured to: transform a point in the to-be-trained point cloud data to generate two-dimensional label data with 26 channels if the point is on the vehicle contour, wherein the value of a first channel in the 26 channels is 1, the value of a second channel in the 26 channels is 0, and the $3^{rd}$-$26^{th}$ channels in the 26 channels are respective rotation vectors of coordinates of vertexes of a three-dimensional cube where a vehicle is located with respect to a three-dimensional coordinate of the point on the vehicle contour in the to-be-trained point cloud data; and transform a point in the to-be-trained point cloud data to generate two-dimensional label data with 2 channels if the point is not on the vehicle contour, wherein the value of a first channel in the 2 channels is 0, and the value of a second channel in the 2 channels is 1.

In some embodiments, the rotation vector $(x'_p, y'_p, z'_p)$ of a coordinate of a vertexe of a three-dimensional cube where a vehicle is located with respect to a three-dimensional coordinate of the point on the vehicle contour in the to-be-trained point cloud data is:

$$\begin{pmatrix} x'_p \\ y'_p \\ z'_p \end{pmatrix} = R^T \begin{pmatrix} x_p - x_i \\ y_p - y_i \\ z_p - z_i \end{pmatrix};$$

wherein R is a rotation matrix of a point $P(x_i, y_i, z_i)$ on the vehicle contour in the point cloud data, and:

$R = R_{zi}(\theta_i) R_{yi}(\phi_i);$ $\theta_i = a\tan 2(y_i, x_i)$ $\phi_i = \arcsin(z_i / \sqrt{x_i^2 + y_i^2 + z_i^2});$ $$R_{zi}(\theta_i) = \begin{bmatrix} \cos\theta_i & -\sin\theta_i & 0 \\ \sin\theta_i & \cos\theta_i & 0 \\ 0 & 0 & 1 \end{bmatrix};$$

$$R_{yi}(\phi_i) = \begin{bmatrix} \cos\phi_i & 0 & \sin\phi_i \\ 0 & 1 & 0 \\ -\sin\phi_i & 0 & \cos\phi_i \end{bmatrix}.$$

In some embodiments, the training module is further configured to: initialize parameters of the fully convolutional neural network; adjust the parameters of the fully convolutional neural network based on a loss function, wherein the loss function is a deviation between the label data corresponding to a current output and the label data corresponding to the to-be-trained point cloud data, and the current output is an output of the fully convolutional neural network corresponding to current to-be-trained point cloud data and current parameters of the fully convolutional neural network; output parameters corresponding to the loss function as parameters of the vehicle detection model if the loss function is at a minimum value; and otherwise, return to execute the step of adjusting the parameters of the fully convolutional neural network based on a loss function.

In some embodiments, the detecting module is further configured to: map to-be-detected three-dimensional data, which is collected by the point cloud data collecting device, to generate a to-be-detected depth map, the values of pixel points in the to-be-detected depth map corresponding to respective to-be-detected points in the to-be-detected point cloud data corresponding to the to-be-detected three-dimensional data; acquire a predicted result of each of the to-be-detected points in the to-be-detected point cloud data based on the vehicle detection model, wherein the predicted result comprises a probability that the to-be-detected point is on the vehicle contour; and determine that a to-be-detected point is on the vehicle contour if the probability that the to-be-detected point is on the vehicle contour is greater than a preset threshold.

In some embodiments, the predicted result further comprises location information of the to-be-detected point; the detecting module is further configured to: acquire first to-be-detected points whose probabilities are each greater than the preset threshold in the to-be-detected point cloud data, to form a set of the first to-be-detected points; and generate spatial vehicle location information corresponding to the to-be-detected point cloud data based on the location information of the to-be-detected points in the set of the first to-be-detected points.

The method and apparatus for detecting a vehicle contour based on point cloud data according to the present application train the fully convolutional neural network model by using the point cloud data collected by the point cloud data collecting device and the labeling for the point cloud data, to obtain the vehicle detection model suitable for the vehicle contour detection, and use the vehicle detection model to determine whether the point cloud data contains a vehicle contour, thereby overcoming the difficulty in detection and the detection error caused by the two-dimensional size change of the vehicle during the vehicle contour is detected by using traditional two-dimensional images.

In addition, in some embodiments, the solutions of the present application can directly obtain the spatial location information of the vehicle when the vehicle contour is detected, so as to facilitate the path planning and control for the automatic driving of a driven vehicle.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF PREFERRED EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
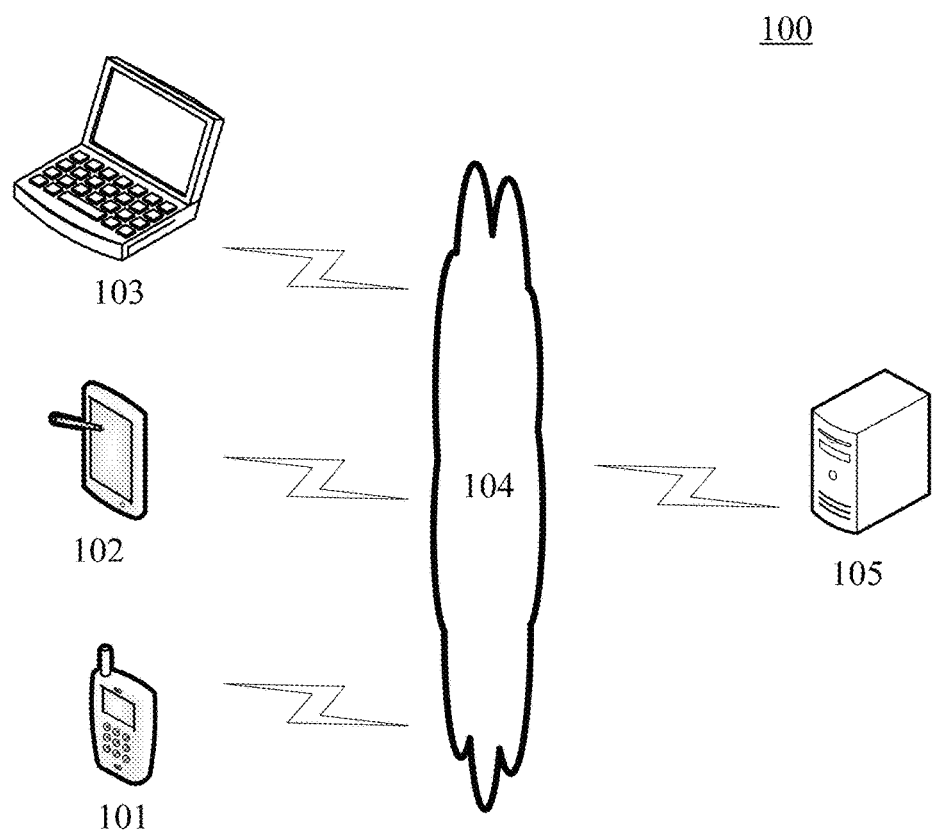
FIG. 1 is a diagram showing an exemplary system architecture in which the present application may be applied.

FIG. 1 shows an exemplary architecture of a system 100 which may be used by a method for detecting a vehicle contour based on point cloud data or an apparatus for detecting a vehicle contour based on point cloud data according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless communication links, or optical fibers.

The user may use the terminal devices 101, 102 and 103 to interact with the server 105 through the network 104, in order to transmit or receive messages, etc.

In some application scenarios, the terminal devices 101, 102, and 103 may be any electronic devices capable of collecting point cloud data. For example, the terminal devices 101, 102, and 103 may be three-dimensional laser scanners.

Alternatively, in some other application scenarios, the terminal devices 101, 102, and 103 may perform data communication with a point cloud data collecting device to acquire the point cloud data collected by the point cloud data collecting device. For example, the terminal devices 101, 102, and 103 may be various electronic devices including, but not limited to, a smart phone, a tablet computer, an e-book reader, a Moving Picture Experts Group Audio Layer III (MP3) player, a Moving Picture Experts Group Audio Layer IV (MP4) player, a laptop portable computer, a desktop computer, and on the like.

The server 105 may be a server providing various services, for example, a background server for processing and analyzing the point cloud data acquired by the terminal devices 101, 102, and 103. The background server may perform processing, such as analysis, on the received point cloud data, and feed the processing result (for example, whether the point cloud data includes a vehicle contour) back to the terminal devices.

It should be noted that the method for detecting a vehicle contour based on point cloud data according to the embodiments of the present application may be executed by the server 105, and may also be executed by the terminal devices 101, 102, or 103. Accordingly, the apparatus for detecting a vehicle contour based on point cloud data may be set in the server 105, and may also be set in the terminal devices 101, 102, or 103.

It should be appreciated that the numbers of the terminal devices, the networks and the servers in FIG. 1 are merely illustrative. Any number of terminal devices, networks and servers may be provided based on the actual requirements.

Figure 2:
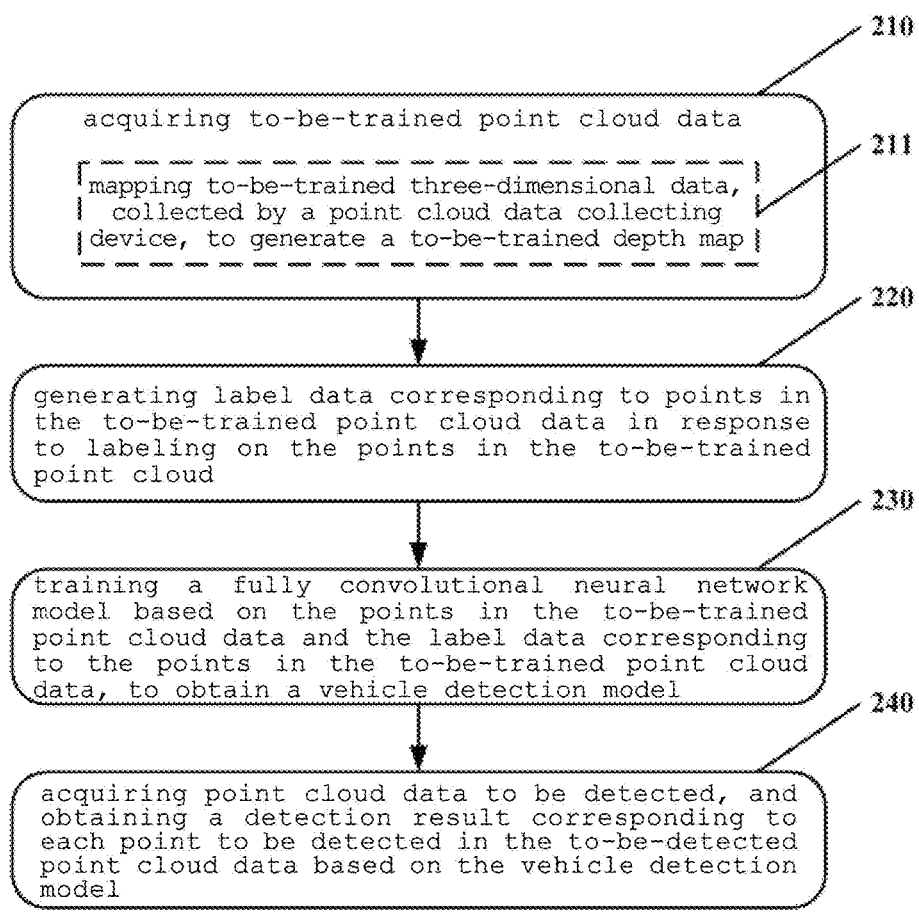
FIG. 2 is a flow chart of the method for detecting a vehicle contour based on point cloud data according to an embodiment of the present application.

Referring to FIG. 2, it shows a process 200 of a method for detecting a vehicle contour based on point cloud data according to one embodiment of the present application. The method for detecting a vehicle contour based on point cloud data includes the following steps.

Step 210, acquire to-be-trained point cloud data.

In the embodiment, an electronic device (e.g., the server or terminal device as shown in FIG. 1) where the method for detecting a vehicle contour based on point cloud data runs may acquire the point cloud data from a device capable of collecting point cloud data in a wired or wireless connection. It should be pointed out that the wireless connection may include, but not limited to, 3G/4G connection, WiFi connection, Bluetooth connection, WiMAX connection, Zigbee connection, ultra wideband (UWB) connection and other wireless connections known or to be developed.

The point cloud is a set of mass points for expressing the spatial distribution and surface characteristics of an object obtained by acquiring a spatial coordinate of each sampling point on the surface of the object in a certain spatial reference system using a laser. That is, each point cloud may correspond to a certain scenario picture, similar to a picture captured by a camera. In addition, the point cloud is capable of reflecting a three-dimensional model and information of lines, surfaces, bodies, and the like of objects in the scenario picture.

Step 220, generate label data corresponding to points in the to-be-trained point cloud data in response to labeling on the points in the to-be-trained point cloud data, wherein the labeling is used to indicate whether each of the points in the to-be-trained point cloud data is on a vehicle contour.

In some alternative implementations, points in the to-be-trained point cloud data may be labeled by means of manual aids, to indicate whether each point in the to-be-trained point cloud data is on a vehicle contour.

Since the labeling is used to indicate whether each point in the to-be-trained point cloud data is on a vehicle contour, the label data generated based on the labeling contains information on whether a point is on the vehicle contour.

Step 230, train a fully convolutional neural network model based on the points in the to-be-trained point cloud data and the label data corresponding to the points in the to-be-trained point cloud data, to obtain a vehicle detection model.

Generally, the basic structure of the Convolutional Neural Networks (CNN) model includes two layers. One layer is a feature extracting layer, in which the input of each neuron is associated with a local accepted domain in the previous layer, and the local feature is extracted. Once the local feature is extracted, the spatial relationship between the local feature and other features may be determined subsequently. The other layer is a feature mapping layer, in which each calculation layer of the network is composed of multiple feature mappings, each feature mapping is a plane, and all the neurons on the plane have the same weighting value.

In some alternative implementations, the to-be-trained point cloud data may be inputted into the CNN model, and parameters of the CNN model can be iteratively adjusted based on a deviation between the output of the CNN model and the label data corresponding to the to-be-trained point cloud data, so as to minimize the deviation between the output of the trained CNN model and the label data corresponding to the to-be-trained point cloud data.

Step 240, acquire to-be-detected point cloud data, and obtain a detection result corresponding to each to-be-detected point in the to-be-detected point cloud data based on the vehicle detection model.

Through steps 210-240, a vehicle detection model can be obtained. In step 240, each to-be-detected point in the to-be-detected point cloud data may be inputted into the vehicle detection model, to detect whether the to-be-detected point cloud data contains a vehicle contour. The method for detecting a vehicle contour based on point cloud data of the present embodiment uses three-dimensional point cloud data as the basis for detection, thereby avoiding the difficulty in detection and detection error caused by the change of the two-dimensional size of a vehicle during the vehicle contour is detected by using traditional two-dimensional images.

In some alternative implementations, the acquiring of to-be-trained point cloud data in step 210 may includes:

Step 211, map to-be-trained three-dimensional data, collected by a point cloud data collecting device, to generate a to-be-trained depth map, the values of respective pixel points in the to-be-trained depth map being respective points in the to-be-trained point cloud data corresponding to the to-be-trained three-dimensional data.

In some application scenarios of these alternative implementations, the to-be-trained three-dimensional data D (x, y, z) may be a coordinate in a coordinate system taking the point cloud data collecting device as an origin, an upward vertical direction as a z axis, and any two axes perpendicular to each other in a horizontal plane as an x axis and a y axis. Moreover, in the to-be-trained depth map obtained on the basis of the to-be-trained three-dimensional data D, the coordinate of each pixel point in the to-be-trained depth map is (r, c), and the value of each of the pixel points is (d, z), wherein:

$$\begin{cases} r = \lfloor \theta/\Delta\theta \rfloor \\ c = \lfloor \phi/\Delta\phi \rfloor \\ d = \sqrt{x^2 + y^2} \\ \theta = \operatorname{atan2}(y, x) \\ \phi = \arcsin(z/\sqrt{x^2 + y^2 + z^2}) \end{cases} \quad (1)$$

That is, in the depth map, the value in the position at the $r^{th}$ row and the $c^{th}$ column is (d, z).

$\theta$ is an angle between a line connecting the to-be-trained three-dimensional data D to the origin and a first plane, $\Delta\theta$ is a horizontal resolution of the point cloud data collecting device, and the first plane is a plane where the y axis and the z axis locate. That is, $\theta$ may be considered as a "drift angle" of the to-be-trained three-dimensional data D with respect to the vertical plane.

$\phi$ is an angle between a line connecting the to-be-trained three-dimensional data D to the origin and a second plane, $\Delta\phi$ is a vertical resolution of the point cloud data collecting device, and the second plane is a plane where the x axis and the y axis locate. That is, $\phi$ may be considered as a "pitch angle" of the to-be-trained three-dimensional data D with respect to the horizontal plane.

In addition, the meaning of the a tan 2 (y, x) is an angle between a ray starting from the coordinate origin and pointing to the point (x, y) and the positive direction of the x axis in the coordinate plane where the x axis and the y axis locate.

In some alternative implementations, the generating of label data corresponding to points in the to-be-trained point cloud data in response to labeling on the points in the to-be-trained point cloud data in step 220 may include:

Step 221, transform a point in the to-be-trained point cloud data to generate two-dimensional label data with 26 channels if the point is on the vehicle contour, wherein the value of a first channel in the 26 channels is 1, the value of a second channel in the 26 channels is 0, and the $3^{rd}$-$26^{th}$ channels in the 26 channels are respective rotation vectors of coordinates of vertexes of a three-dimensional cube where a vehicle is located with respect to a three-dimensional coordinate of the point on the vehicle contour in the to-be-trained point cloud data.

Step 222, transform a point in the to-be-trained point cloud data to generate two-dimensional label data with 2 channels if the point is not on the vehicle contour, wherein the value of a first channel in the 2 channels is 0, and the value of a second channel in the 2 channels is 1.

That is, regardless of a certain point in the to-be-trained point cloud data being on or not on the vehicle contour, in the obtained two-dimensional label data, the value of the first channel may be used to represent the probability that the point is on the vehicle contour, and the value of the second channel may be used to represent the probability that the point is not on the vehicle contour. It can be seen that the values of the first and second channels are both non-negative numbers, and the sum of the values of the first and second channels is 1.

In some application scenarios of these alternative implementations, the to-be-trained point cloud data may include some points that cannot be clearly determined to be on the vehicle contour or not. In these application scenarios, suitable values may be set at the first and second channels in the two-dimensional label data corresponding to each of these points, to reflect the probability that the point is on the vehicle contour.

In some alternative implementations, the rotation vector $(x'_p, y'_p, z'_p)$ of a coordinate of a vertexe of a three-dimensional cube where a vehicle is located with respect to a three-dimensional coordinate of the point on the vehicle contour in the to-be-trained point cloud data may be expressed with the following formula (2).

Specifically, $$\begin{pmatrix} x'_p \\ y'_p \\ z'_p \end{pmatrix} = R^T \begin{pmatrix} x_p - x_i \\ y_p - y_i \\ z_p - z_i \end{pmatrix} \quad (2)$$

wherein R is a rotation matrix of a point $P(x_i, y_i, z_i)$ on the vehicle contour in the point cloud data, and:

$R = R_{zi}(\theta_i) R_{yi}(\phi_i);$ $\theta_i = a \tan 2(y_i, x_i)$ $\phi_i = \arcsin(z_i/\sqrt{x_i^2 + y_i^2 + z_i^2});$ $$R_{zi}(\theta_i) = \begin{bmatrix} \cos\theta_i & -\sin\theta_i & 0 \\ \sin\theta_i & \cos\theta_i & 0 \\ 0 & 0 & 1 \end{bmatrix};$$

$$R_{yi}(\phi_i) = \begin{bmatrix} \cos\phi_i & 0 & \sin\phi_i \\ 0 & 1 & 0 \\ -\sin\phi_i & 0 & \cos\phi_i \end{bmatrix}.$$

Herein, $\theta_i$ and $\phi_i$ may have the meanings similar to those of $\theta$ and $\phi$ in the formula (1). That is, $\theta_i$ is an angle between a line connecting any point $P(x_i, y_i, z_i)$ on the vehicle contour to the origin and the first plane, the first plane being a plane where the y axis and the z axis locate. $\phi_i$ is an angle between the line connecting any point $P(x_i, y_i, z_i)$ on the vehicle contour to the origin and the second plane, the second plane being a plane where the x axis and the y axis locate.

Figure 3:
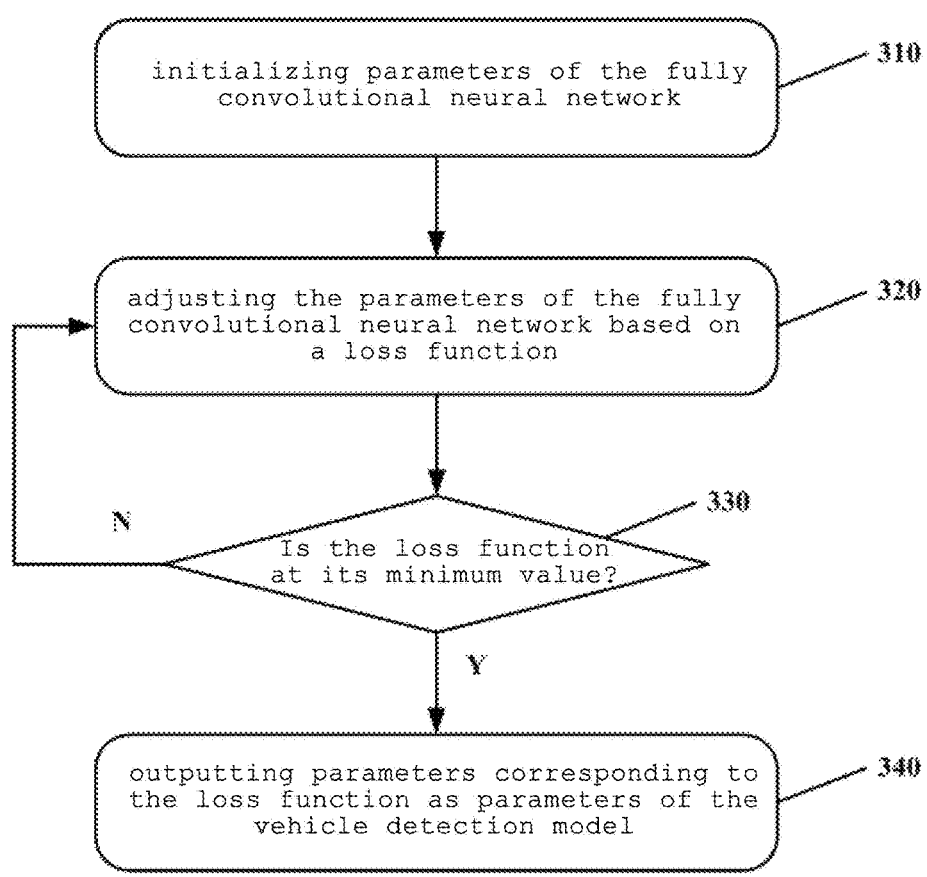
FIG. 3 is a schematic flow chart of an alternative implementation of training a fully convolutional neural network model based on the points in the to-be-trained point cloud data and the label data corresponding to the points in the to-be-trained point cloud data to obtain a vehicle detection model in FIG. 2.

In some alternative implementations, step 230 in the method for detecting a vehicle contour based on point cloud data of the present embodiment may be implemented through a process 300 shown in FIG. 3.

Step 310, initialize parameters of the fully convolutional neural network.

Step 320, adjust the parameters of the fully convolutional neural network based on a loss function.

Herein, the loss function may be a deviation between the label data corresponding to a current output and the label data corresponding to the to-be-trained point cloud data, and the current output is an output of the fully convolutional neural network corresponding to current to-be-trained point cloud data and current parameters of the fully convolutional neural network.

Step 330, determine whether the loss function corresponding to the current output is a minimum value.

If yes, in step 340, output parameters corresponding to the loss function as parameters of the vehicle detection model.

Otherwise, that is, if the loss function corresponding to the current output is not a minimum value, the adjusting of the parameters of the fully convolutional neural network based on a loss function in step 320 is repeated until the loss function is a minimum value.

Figure 4:
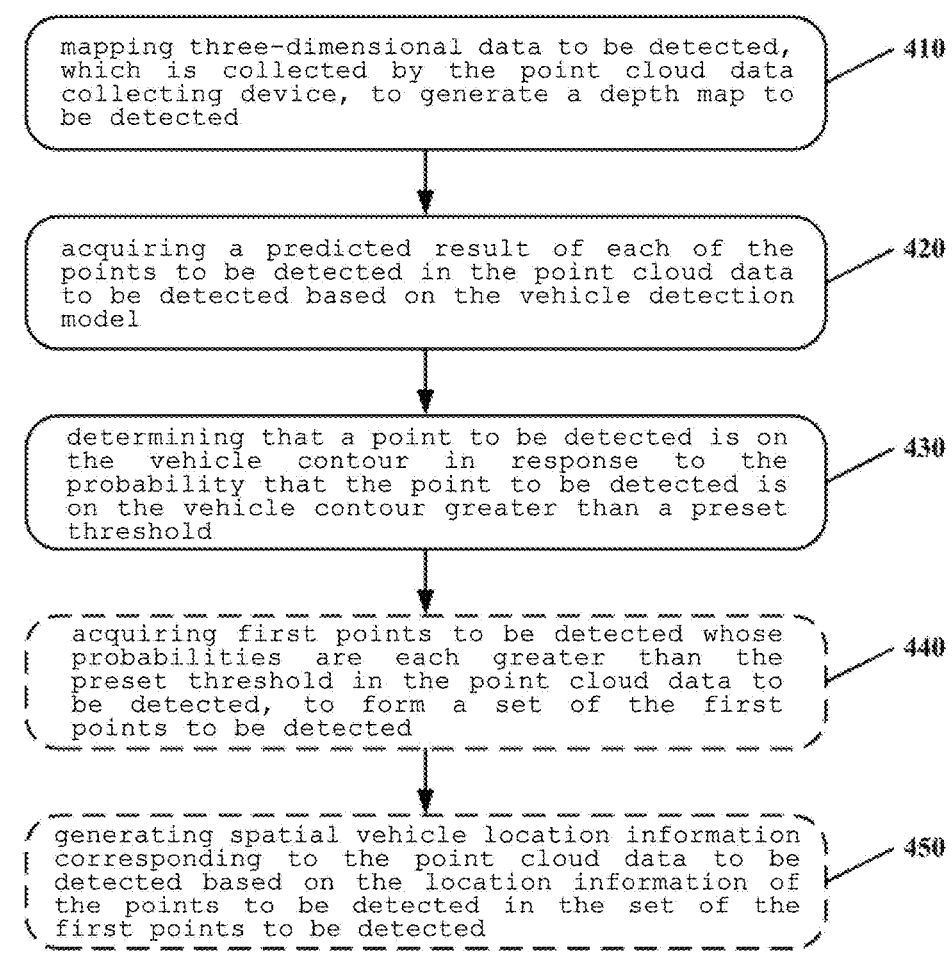
FIG. 4 is a schematic flow chart of an alternative implementation of acquiring to-be-detected point cloud data, and obtaining a detection result corresponding to each to-bedetected point in the to-be-detected point cloud data based on the vehicle detection model in FIG. 2.

In some alternative implementations, the acquiring to-be-detected point cloud data, and obtaining a detection result corresponding to each to-be-detected point in the to-be-detected point cloud data based on the vehicle detection model in step 240 may be implemented through a process 400 shown in FIG. 4.

Step 410, map to-be-detected three-dimensional data, collected by the point cloud data collecting device, to generate a to-be-detected depth map, the values of pixel points in the to-be-detected depth map corresponding to respective to-be-detected points in the to-be-detected point cloud data corresponding to the to-be-detected three-dimensional data. In some alternative implementations, the to-be-detected depth map may correspond to the to-be-detected three-dimensional data collected by the point cloud data collecting device and may be obtained through the above formula (1).

Step 420, acquire a predicted result of each of the to-be-detected points in the to-be-detected point cloud data based on the vehicle detection model, wherein the predicted result comprises a probability that the to-be-detected point is on the vehicle contour.

Step 430, determine that a to-be-detected point is on the vehicle contour if the probability that the to-be-detected point is on the vehicle contour is greater than a preset threshold.

In some optional implementation manners, the predicted result may further include location information of the to-be-detected points.

In these alternative implementations, the process 400 may further include:

Step 440, acquire first to-be-detected points whose probabilities are each greater than the preset threshold in the to-be-detected point cloud data, to form a set of the first to-be-detected points.

Step 450, generate spatial vehicle location information corresponding to the to-be-detected point cloud data based on the location information of the to-be-detected points in the set of the first to-be-detected points.

In some application scenarios, the detection result obtained after the to-be-detected point cloud data is inputted into the vehicle detection model may have the same representation form as the two-dimensional label data of the points in the to-be-trained point cloud data, which are on the vehicle contour. That is, the detection result also has 26 channels, in which the value of the first channel represents the probability that the to-be-detected point is on the vehicle contour based on the current vehicle detection model, and the value of the second channel represents the probability that the to-be-detected point is not on the vehicle contour based on the current vehicle detection model. The values of the $3^{rd}$-$26^{th}$ channels may be used to represent a spatial location of the to-be-detected point.

In this way, the to-be-detected points each having a value of the first channel greater than a preset threshold in the detection result of the to-be-detected point cloud data are considered as the points on the vehicle contour. Through a technique such as data fusion, the location where the vehicle locates in the to-be-detected point cloud data may be reproduced according to the spatial locations of the points on the vehicle contour.

The method according to the embodiments of the present application trains the fully convolutional neural network model by using the point cloud data collected by the point cloud data collecting device and the labeling for the point cloud data, to obtain the vehicle detection model suitable for the vehicle contour detection, and uses the vehicle detection model to determine whether the point cloud data contains a vehicle contour, thereby overcoming the difficulty in detection and the detection error caused by the two-dimensional size change of the vehicle during the vehicle contour is detected by using traditional two-dimensional images.

Figure 5:
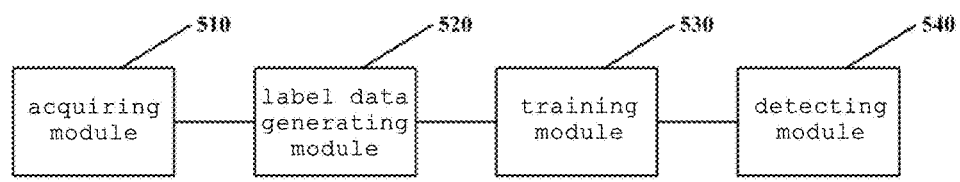
FIG. 5 is a schematic structural view of an apparatus for detecting a vehicle contour based on point cloud data according to an embodiment of the present application.

Further referring to FIG. 5, as an implementation for the methods shown in the above figures, an embodiment of the present application provides an apparatus for detecting a vehicle contour based on point cloud data, the apparatus in this embodiment corresponds to the method of the embodiment shown in FIG. 2, and the apparatus may be specifically applied in a variety of electronic devices.

As shown in FIG. 5, the apparatus 500 in the present embodiment includes an acquiring module 510, a label data generating module 520, a training module 530, and a detecting module 540.

Specifically, the acquiring module 510 may be configured to acquire to-be-trained point cloud data.

The label data generating module 520 may be configured to generate label data corresponding to points in the to-be-trained point cloud data in response to labeling on the points in the to-be-trained point cloud data, the labeling used to indicate whether each of the points in the to-be-trained point cloud data is on a vehicle contour.

The training module 530 may be configured to train a fully convolutional neural network model based on the points in the to-be-trained point cloud data and the label data corresponding to the points in the to-be-trained point cloud data, to obtain a vehicle detection model.

The detecting module 540 may be configured to acquire to-be-detected point cloud data, and obtain a detection result corresponding to each to-be-detected point in the to-be-detected point cloud data based on the vehicle detection model.

In some alternative implementations, the acquiring module 510 may be further configured to: map to-be-trained three-dimensional data, collected by a point cloud data collecting device, to generate a to-be-trained depth map, the values of respective pixel points in the to-be-trained depth map being respective points in the to-be-trained point cloud data corresponding to the to-be-trained three-dimensional data.

In some alternative implementations, the to-be-trained three-dimensional data D (x, y, z) is a coordinate in a coordinate system taking the point cloud data collecting device as an origin, an upward vertical direction as a z axis, and any two axes perpendicular to each other in a horizontal plane as an x axis and a y axis; the coordinate of each pixel point in the to-be-trained depth map is (r, c), and the value of each of the pixel points is (d, z); wherein:

$$r = \lfloor \theta / \Delta \theta \rfloor$$

$$c = \lfloor \phi / \Delta \phi \rfloor$$

$$d = \sqrt{x^2 + y^2}$$

$$\theta = a \tan 2(y, x)$$

$$\phi = \arcsin(z / \sqrt{x^2 + y^2 + z^2});$$

θ is an angle between a line connecting the to-be-trained three-dimensional data D to the origin and a first plane, Δθ is a horizontal resolution of the point cloud data collecting device, and the first plane is a plane where the y axis and the z axis locate; and φ is an angle between a line connecting the to-be-trained three-dimensional data D to the origin and a second plane, Δφ is a vertical resolution of the point cloud data collecting device, and the second plane is a plane where the x axis and the y axis locate.

In some alternative implementations, the label data generating module 520 may be further configured to: transform a point in the to-be-trained point cloud data to generate two-dimensional label data with 26 channels if the point is on the vehicle contour, wherein the value of a first channel in the 26 channels is 1, the value of a second channel in the 26 channels is 0, and the $3^{rd}$-$26^{th}$ channels in the 26 channels are respective rotation vectors of coordinates of vertexes of a three-dimensional cube where a vehicle is located with respect to a three-dimensional coordinate of the point on the vehicle contour in the to-be-trained point cloud data; and transform a point in the to-be-trained point cloud data to generate two-dimensional label data with 2 channels if the point is not on the vehicle contour, wherein the value of a first channel in the 2 channels is 0, and the value of a second channel in the 2 channels is 1.

In some alternative implementations, the rotation vector $(x'_p, y'_p, z'_p)$ of a coordinate of a vertexe of a three-dimensional cube where a vehicle is located with respect to a three-dimensional coordinate of the point on the vehicle contour in the to-be-trained point cloud data is:

$$\begin{pmatrix} x'_p \\ y'_p \\ z'_p \end{pmatrix} = R^T \begin{pmatrix} x_p - x_i \\ y_p - y_i \\ z_p - z_i \end{pmatrix};$$

wherein R is a rotation matrix of a point $P(x_i, y_i, z_i)$ on the vehicle contour in the point cloud data, and:

$$R = R_{zi}(\theta_i) R_{yi}(\phi_i);$$

$$\theta_i = a \tan 2(y_i, x_i)$$

$$\phi_i = \arcsin(z_i / \sqrt{x_i^2 + y_i^2 + z_i^2});$$

$$R_{zi}(\theta_i) = \begin{bmatrix} \cos\theta_i & -\sin\theta_i & 0 \\ \sin\theta_i & \cos\theta_i & 0 \\ 0 & 0 & 1 \end{bmatrix};$$

$$R_{yi}(\phi_i) = \begin{bmatrix} \cos\phi_i & 0 & \sin\phi_i \\ 0 & 1 & 0 \\ -\sin\phi_i & 0 & \cos\phi_i \end{bmatrix}.$$

In some alternative implementations, the training module 530 may be further configured to: initialize parameters of the fully convolutional neural network; adjust the parameters of the fully convolutional neural network based on a loss function, wherein the loss function is a deviation between the label data corresponding to a current output and the label data corresponding to the to-be-trained point cloud data, and the current output is an output of the fully convolutional neural network corresponding to current to-be-trained point cloud data and current parameters of the fully convolutional neural network; output parameters corresponding to the loss function as parameters of the vehicle detection model if the loss function is at a minimum value; and otherwise, return to execute the step of adjusting the parameters of the fully convolutional neural network based on a loss function.

In some alternative implementations, the detecting module 540 may be further configured to: map to-be-detected three-dimensional data, which is collected by the point cloud data collecting device, to generate a to-be-detected depth map, the values of pixel points in the to-be-detected depth map corresponding to respective to-be-detected points in the to-be-detected point cloud data corresponding to the to-be-detected three-dimensional data; and acquire a predicted result of each of the to-be-detected points in the to-be-detected point cloud data based on the vehicle detection model.

Herein, the predicted result may include a probability that the to-be-detected point is on the vehicle contour. If the probability that the to-be-detected point is on the vehicle contour is greater than a preset threshold, it is determined that a to-be-detected point is on the vehicle contour.

In some alternative implementations, the predicted result may further include location information of the to-be-detected point.

In these alternative implementations, the detecting module 540 may be further configured to: acquire first to-be-detected points whose probabilities are each greater than the preset threshold in the to-be-detected point cloud data, to form a set of the first to-be-detected points; and generate spatial vehicle location information corresponding to the to-be-detected point cloud data based on the location information of the to-be-detected points in the set of the first to-be-detected points.

Those skilled in the art may understand that the apparatus 500 for detecting a vehicle contour based on point cloud data further includes some commonly known structures, such as a processor, and a memory. In order to avoid unnecessarily obscuring the embodiments disclosed in this disclosure, these commonly known structures are not shown in FIG. 5.

Figure 6:
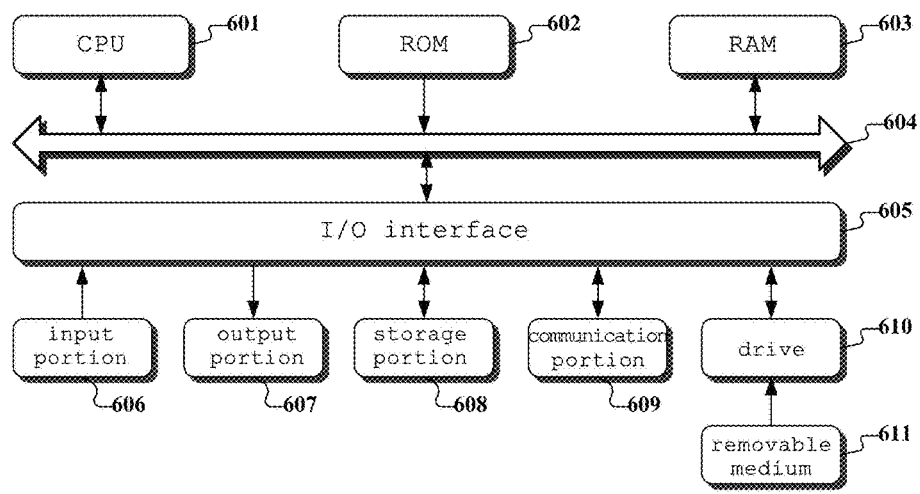
FIG. 6 is a schematic structural view of a computer system adapted to implement a terminal apparatus or a server of the embodiments of the present application.

Referring to FIG. 6, a schematic structural diagram of a computer system 600 adapted to implement a terminal apparatus or a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an acquiring module, a label data generating module, a training module and a detecting module, where the names of these units or modules are not considered as a limitation to the units or modules. For example, the acquiring unit may also be described as "a unit for acquiring to-be-trained point cloud data".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. When the one or more programs are executed by a device, the device is to: acquire to-be-trained point cloud data; generate label data corresponding to points in the to-be-trained point cloud data in response to labeling on the points in the to-be-trained point cloud data, the labeling used to indicate whether each of the points in the to-be-trained point cloud data is on a vehicle contour; train a fully convolutional neural network model based on the points in the to-be-trained point cloud data and the label data corresponding to the points in the to-be-trained point cloud data, to obtain a vehicle detection model; and a detecting module, configured to acquire to-be-detected point cloud data, and obtain a detection result corresponding to each to-be-detected point in the to-be-detected point cloud data based on the vehicle detection model.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for detecting a vehicle contour based on point cloud data, comprising:
   acquiring to-be-trained point cloud data;
   generating label data corresponding to points in the to-be-trained point cloud data in response to labeling on the points in the to-be-trained point cloud, the labeling used to indicate whether each of the points in the to-be-trained point cloud data is on a vehicle contour;
   training a fully convolutional neural network model based on the points in the to-be-trained point cloud data and the label data corresponding to the points in the to-be-trained point cloud data, to obtain a vehicle detection model; and
   acquiring to-be-detected point cloud data, and obtaining a detection result corresponding to each to-be-detected point in the to-be-detected point cloud data based on the vehicle detection model, wherein the training of a fully convolutional neural network model based on the points in the to-be-trained point cloud data and the label data corresponding to the points in the to-be-trained point cloud data, to obtain a vehicle detection model comprises, initializing parameters of the fully convolutional neural network;

adjusting the parameters of the fully convolutional neural network based on a loss function, wherein the loss function is a deviation between the label data corresponding to a current output and the label data corresponding to the to-be-trained point cloud data, and the current output is an output of the fully convolutional neural network corresponding to current to-be-trained point cloud data and current parameters of the fully convolutional neural network;

outputting parameters corresponding to the loss function as parameters of the vehicle detection model if the loss function is at a minimum value; and otherwise, returning to execute the step of adjusting the parameters of the fully convolutional neural network based on a loss function.

2. The method according to claim 1, wherein the acquiring of to-be-trained point cloud data comprises:

mapping to-be-trained three-dimensional data, collected by a point cloud data collecting device, to generate a to-be-trained depth map, the values of respective pixel points in the to-be-trained depth map being respective points in the to-be-trained point cloud data corresponding to the to-be-trained three-dimensional data.

3. The method according to claim 2, wherein the to-be-trained three-dimensional data D (x, y, z) is a coordinate in a coordinate system taking the point cloud data collecting device as an origin, an upward vertical direction as a z axis, and any two axes perpendicular to each other in a horizontal plane as an x axis and a y axis;

the coordinate of each pixel point in the to-be-trained depth map is (r, c), and the value of each of the pixel points is (d, z);

wherein $r=\lfloor \theta/\Delta\theta \rfloor$ $c=\lfloor \varphi/\Delta\varphi \rfloor$ $d=\sqrt{x^2+y^2}$ $\theta=a \tan 2(y,x)$ $\varphi=\arcsin(z/\sqrt{x^2+y^2+z^2})$;

θ is an angle between a line connecting the to-be-trained three-dimensional data D to the origin and a first plane, Δθ is a horizontal resolution of the point cloud data collecting device, and the first plane is a plane where the y axis and the z axis locate; and φ is an angle between a line connecting the to-be-trained three-dimensional data D to the origin and a second plane, Δφ is a vertical resolution of the point cloud data collecting device, and the second plane is a plane where the x axis and the y axis locate.

4. The method according to claim 3, wherein the generating of label data corresponding to points in the to-be-trained point cloud data in response to labeling on the points in the to-be-trained point cloud data comprises:

transforming a point in the to-be-trained point cloud data to generate two-dimensional label data with 26 channels if the point is on the vehicle contour, wherein the value of a first channel in the 26 channels is 1, the value of a second channel in the 26 channels is 0, and the $3^{rd}$-$26^{th}$ channels in the 26 channels are respective rotation vectors of coordinates of vertexes of a three-dimensional cube where a vehicle is located with respect to a three-dimensional coordinate of the point on the vehicle contour in the to-be-trained point cloud data; and transforming a point in the to-be-trained point cloud data to generate two-dimensional label data with 2 channels if the point is not on the vehicle contour, wherein the value of a first channel in the 2 channels is 0, and the value of a second channel in the 2 channels is 1.

5. The method according to claim 3, wherein the rotation vector $(x'_p, y'_p, z'_p)$ of a coordinate of a vertexe of a three-dimensional cube where a vehicle is located with respect to a three-dimensional coordinate of the point on the vehicle contour in the to-be-trained point cloud data is:

$$\begin{pmatrix} x'_p \\ y'_p \\ z'_p \end{pmatrix} = R^T \begin{pmatrix} x_p - x_i \\ y_p - y_i \\ z_p - z_i \end{pmatrix};$$

wherein R is a rotation matrix of a point $P(x_i, y_i, z_i)$ on the vehicle contour in the point cloud data, and:

$R=R_{zi}(\theta_i)R_{yi}(\phi_i)$;

$\theta_i=a \tan 2(y_i,x_i)$ $\phi_i=\arcsin(z_i/\sqrt{x_i^2+y_i^2+z_i^2})$;

$$R_{zi}(\theta_i) = \begin{bmatrix} \cos\theta_i & -\sin\theta_i & 0 \\ \sin\theta_i & \cos\theta_i & 0 \\ 0 & 0 & 1 \end{bmatrix};$$

$$R_{yi}(\phi_i) = \begin{bmatrix} \cos\phi_i & 0 & \sin\phi_i \\ 0 & 1 & 0 \\ -\sin\phi_i & 0 & \cos\phi_i \end{bmatrix}.$$

6. The method according to claim 5, wherein the acquiring of to-be-detected point cloud data, and obtaining of a detection result corresponding to each to-be-detected point in the to-be-detected point cloud data based on the vehicle detection model comprises:

mapping to-be-detected three-dimensional data, which is collected by the point cloud data collecting device, to generate a to-be-detected depth map, the values of pixel points in the to-be-detected depth map corresponding to respective to-be-detected points in the to-be-detected point cloud data corresponding to the to-be-detected three-dimensional data;

acquiring a predicted result of each of the to-be-detected points in the to-be-detected point cloud data based on the vehicle detection model, wherein the predicted result comprises a probability that the to-be-detected point is on the vehicle contour; and determining that a to-be-detected point is on the vehicle contour if the probability that the to-be-detected point is on the vehicle contour is greater than a preset threshold.

7. The method according to claim 6, wherein
the predicted result further comprises location information of the to-be-detected point;
the acquiring of to-be-detected point cloud data, and obtaining of a detection result corresponding to each to-be-detected point in the to-be-detected point cloud data based on the vehicle detection model further comprises:
acquiring first to-be-detected points whose probabilities are each greater than the preset threshold in the to-be-detected point cloud data, to form a set of the first to-be-detected points; and
generating spatial vehicle location information corresponding to the to-be-detected point cloud data based on the location information of the to-be-detected points in the set of the first to-be-detected points.

8. An apparatus for detecting a vehicle contour based on point cloud data, comprising:
at least one processor; and
a memory storing instructions, which when executed by the at least one processor, cause the at least one processor to perform operations, the operations comprising:
acquiring to-be-trained point cloud data;
generating label data corresponding to points in the to-be-trained point cloud data in response to labeling on the points in the to-be-trained point cloud data, the labeling used to indicate whether each of the points in the to-be-trained point cloud data is on a vehicle contour;
training a fully convolutional neural network model based on the points in the to-be-trained point cloud data and the label data corresponding to the points in the to-be-trained point cloud data, to obtain a vehicle detection model; and
acquiring to-be-detected point cloud data, and obtaining a detection result corresponding to each to-be-detected point in the to-be-detected point cloud data based on the vehicle detection model,
wherein the training of a fully convolutional neural network model based on the points in the to-be-trained point cloud data and the label data corresponding to the points in the to-be-trained point cloud data, to obtain a vehicle detection model comprises,
initializing parameters of the fully convolutional neural network;
adjusting the parameters of the fully convolutional neural network based on a loss function, wherein the loss function is a deviation between the label data corresponding to a current output and the label data corresponding to the to-be-trained point cloud data, and the current output is an output of the fully convolutional neural network corresponding to current to-be-trained point cloud data and current parameters of the fully convolutional neural network;
outputting parameters corresponding to the loss function as parameters of the vehicle detection model if the loss function is at a minimum value; and
otherwise, returning to execute the step of adjusting the parameters of the fully convolutional neural network based on a loss function.

9. The apparatus according to claim 8, wherein the acquiring of to-be-trained point cloud data comprises:
mapping to-be-trained three-dimensional data, collected by a point cloud data collecting device, to generate a to-be-trained depth map, the values of respective pixel points in the to-be-trained depth map being respective points in the to-be-trained point cloud data corresponding to the to-be-trained three-dimensional data.

10. The apparatus according to claim 9, wherein
the to-be-trained three-dimensional data D (x, y, z) is a coordinate in a coordinate system taking the point cloud data collecting device as an origin, an upward vertical direction as a z axis, and any two axes perpendicular to each other in a horizontal plane as an x axis and a y axis;
the coordinate of each pixel point in the to-be-trained depth map is (r, c), and the value of each of the pixel points is (d, z);
wherein, $r = \lfloor \theta / \Delta\theta \rfloor$ $c = \lfloor \phi / \Delta\phi \rfloor$ $d = \sqrt{x^2 + y^2}$ $\theta = a\tan 2(y, x)$ $\phi = \arcsin(z / \sqrt{x^2 + y^2 + z^2})$;

θ is an angle between a line connecting the to-be-trained three-dimensional data D to the origin and a first plane, Δθ is a horizontal resolution of the point cloud data collecting device, and the first plane is a plane where the y axis and the z axis locate; and
φ is an angle between a line connecting the to-be-trained three-dimensional data D to the origin and a second plane, Δφ is a vertical resolution of the point cloud data collecting device, and the second plane is a plane where the x axis and the y axis locate.

11. The apparatus according to claim 10, wherein the generating of label data corresponding to points in the to-be-trained point cloud data in response to labeling on the points in the to-be-trained point cloud data comprises:
transforming a point in the to-be-trained point cloud data to generate two-dimensional label data with 26 channels if the point is on the vehicle contour, wherein the value of a first channel in the 26 channels is 1, the value of a second channel in the 26 channels is 0, and the $3^{rd}$-$26^{th}$ channels in the 26 channels are respective rotation vectors of coordinates of vertexes of a three-dimensional cube where a vehicle is located with respect to a three-dimensional coordinate of the point on the vehicle contour in the to-be-trained point cloud data; and
transforming a point in the to-be-trained point cloud data to generate two-dimensional label data with 2 channels if the point is not on the vehicle contour, wherein the value of a first channel in the 2 channels is 0, and the value of a second channel in the 2 channels is 1.

12. The apparatus according to claim 10, wherein
the rotation vector $(x'_p, y'_p, z'_p)$ of a coordinate of a vertexe of a three-dimensional cube where a vehicle is located with respect to a three-dimensional coordinate of the point on the vehicle contour in the to-be-trained point cloud data is:

$$\begin{pmatrix} x'_p \\ y'_p \\ z'_p \end{pmatrix} = R^T \begin{pmatrix} x_p - x_i \\ y_p - y_i \\ z_p - z_i \end{pmatrix};$$

wherein R is a rotation matrix of a point $P(x_i, y_i, z_i)$ on the vehicle contour in the point cloud data, and:

$R = R_{zi}(\theta_i) R_{yi}(\phi_i);$ $\theta_i = a\tan 2(y_i, x_i)$ $\phi_i = \arcsin(z_i/\sqrt{x_i^2 + y_i^2 + z_i^2});$ $$R_{zi}(\theta_i) = \begin{bmatrix} \cos\theta_i & -\sin\theta_i & 0 \\ \sin\theta_i & \cos\theta_i & 0 \\ 0 & 0 & 1 \end{bmatrix};$$

$$R_{yi}(\phi_i) = \begin{bmatrix} \cos\phi_i & 0 & \sin\phi_i \\ 0 & 1 & 0 \\ -\sin\phi_i & 0 & \cos\phi_i \end{bmatrix}.$$

13. The apparatus according to claim 12, wherein the acquiring of to-be-detected point cloud data, and obtaining of a detection result corresponding to each to-be-detected point in the to-be-detected point cloud data based on the vehicle detection model comprises:
    mapping to-be-detected three-dimensional data, which is collected by the point cloud data collecting device, to generate a to-be-detected depth map, the values of pixel points in the to-be-detected depth map corresponding to respective to-be-detected points in the to-be-detected point cloud data corresponding to the to-be-detected three-dimensional data;
    acquiring a predicted result of each of the to-be-detected points in the to-be-detected point cloud data based on the vehicle detection model, wherein the predicted result comprises a probability that the to-be-detected point is on the vehicle contour; and
    determining that a to-be-detected point is on the vehicle contour if the probability that the to-be-detected point is on the vehicle contour is greater than a preset threshold.

14. The apparatus according to claim 13, wherein
    the predicted result further comprises location information of the to-be-detected point;
    the acquiring of to-be-detected point cloud data, and obtaining of a detection result corresponding to each to-be-detected point in the to-be-detected point cloud data based on the vehicle detection model further comprises:
    acquiring first to-be-detected points whose probabilities are each greater than the preset threshold in the to-be-detected point cloud data, to form a set of the first to-be-detected points; and
    generating spatial vehicle location information corresponding to the to-be-detected point cloud data based on the location information of the to-be-detected points in the set of the first to-be-detected points.

15. A non-transitory storage medium storing one or more programs, the one or more programs when executed by an apparatus, causing the apparatus to perform a method for detecting a vehicle contour based on point cloud data, comprising:
    acquiring to-be-trained point cloud data;
    generating label data corresponding to points in the to-be-trained point cloud data in response to labeling on the points in the to-be-trained point cloud, the labeling used to indicate whether each of the points in the to-be-trained point cloud data is on a vehicle contour;
    training a fully convolutional neural network model based on the points in the to-be-trained point cloud data and the label data corresponding to the points in the to-be-trained point cloud data, to obtain a vehicle detection model; and
    acquiring to-be-detected point cloud data, and obtaining a detection result corresponding to each to-be-detected point in the to-be-detected point cloud data based on the vehicle detection model,
    wherein the training of a fully convolutional neural network model based on the points in the to-be-trained point cloud data and the label data corresponding to the points in the to-be-trained point cloud data, to obtain a vehicle detection model comprises:
    initializing parameters of the fully convolutional neural network;
    adjusting the parameters of the fully convolutional neural network based on a loss function, wherein the loss function is a deviation between the label data corresponding to a current output and the label data corresponding to the to-be-trained point cloud data, and the current output is an output of the fully convolutional neural network corresponding to current to-be-trained point cloud data and current parameters of the fully convolutional neural network;
    outputting parameters corresponding to the loss function as parameters of the vehicle detection model if the loss function is at a minimum value; and
    otherwise, returning to execute the step of adjusting the parameters of the fully convolutional neural network based on a loss function.

* * * * *